April 1, 1947.  L. S. BARNETT  2,418,153
FILTER PRESS
Filed March 4, 1944  4 Sheets-Sheet 1
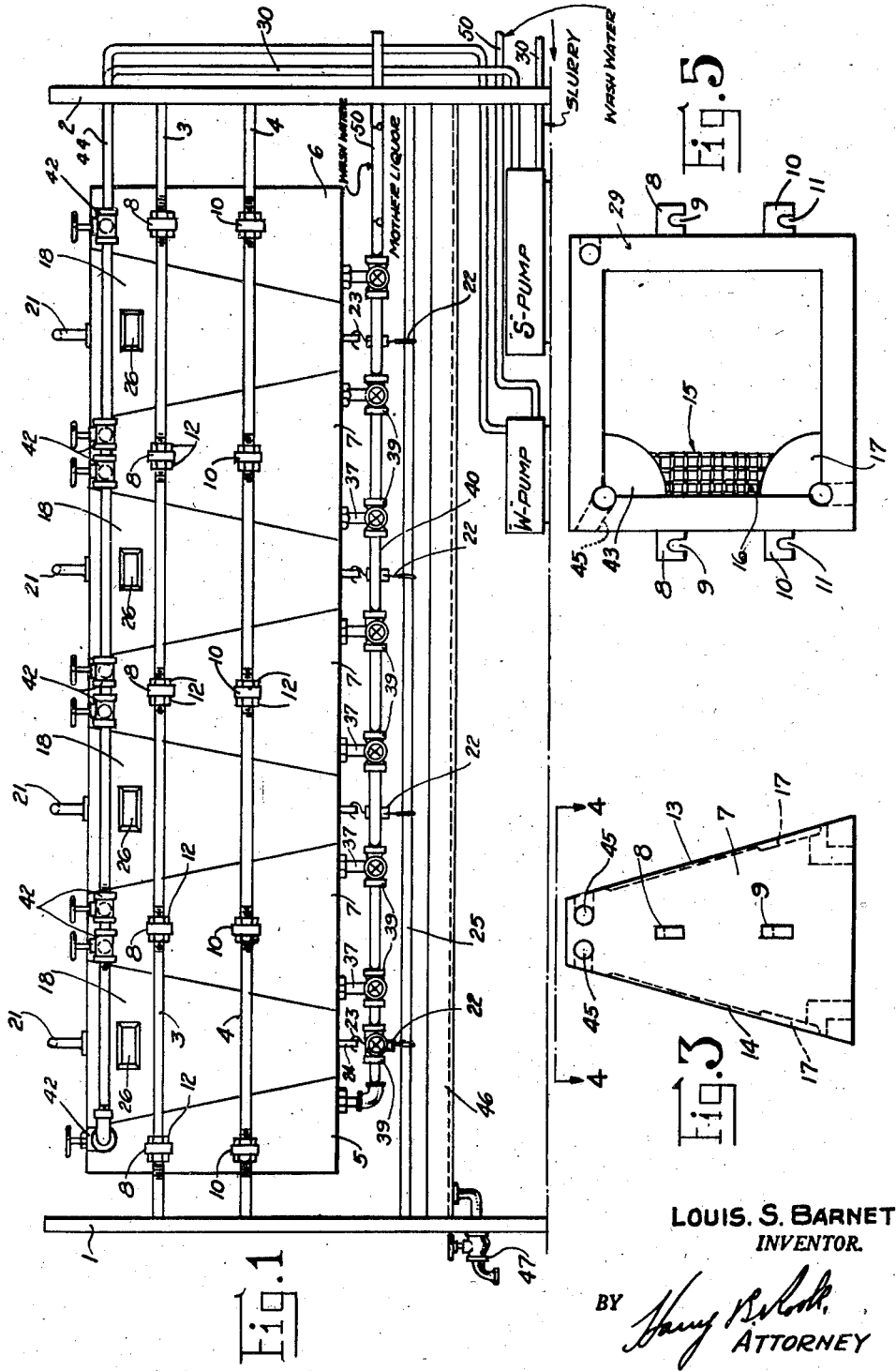
LOUIS. S. BARNETT
INVENTOR.
BY *Harry B. Cook*
ATTORNEY

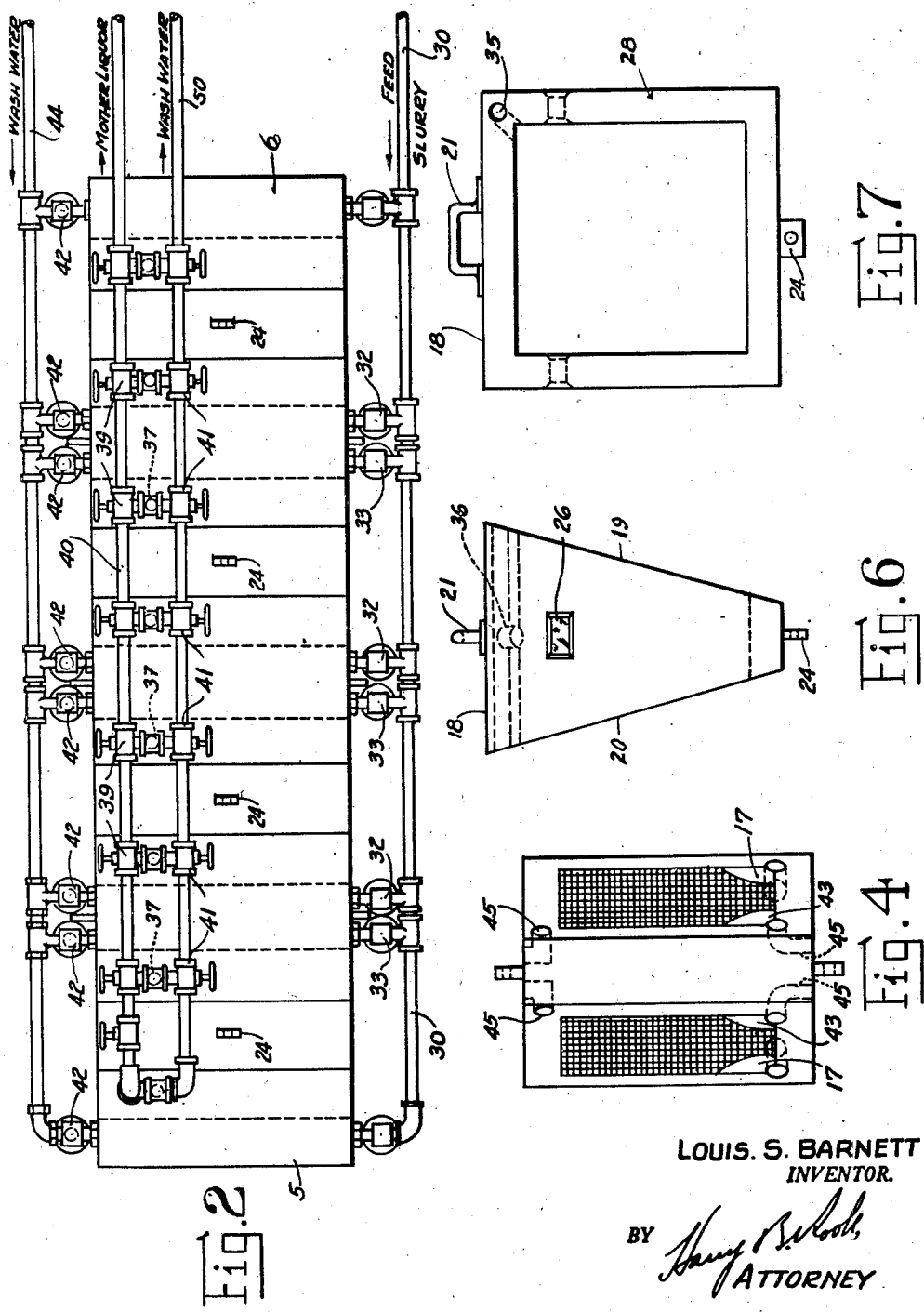

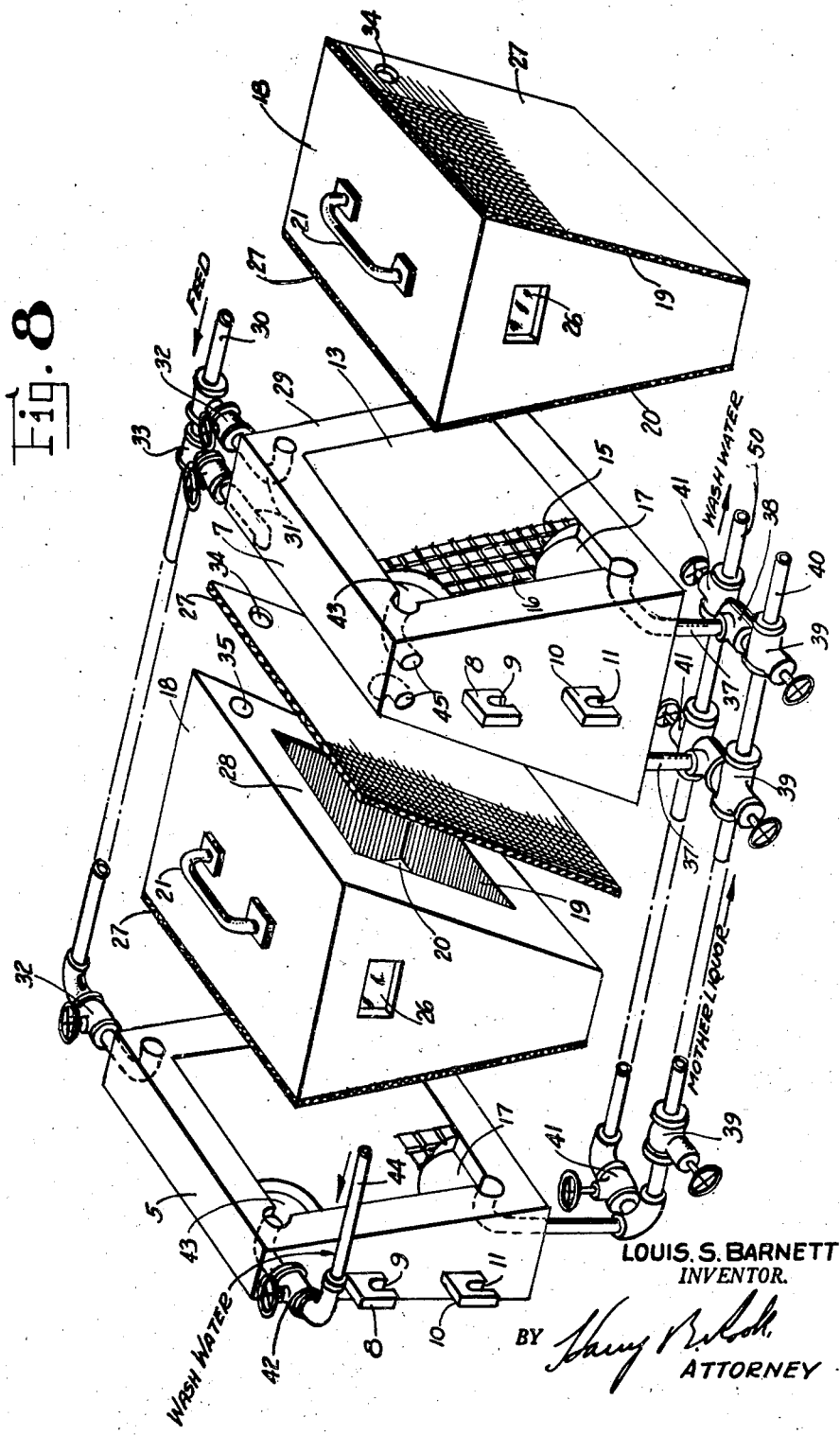

April 1, 1947.   L. S. BARNETT   2,418,153
FILTER PRESS
Filed March 4, 1944   4 Sheets-Sheet 4
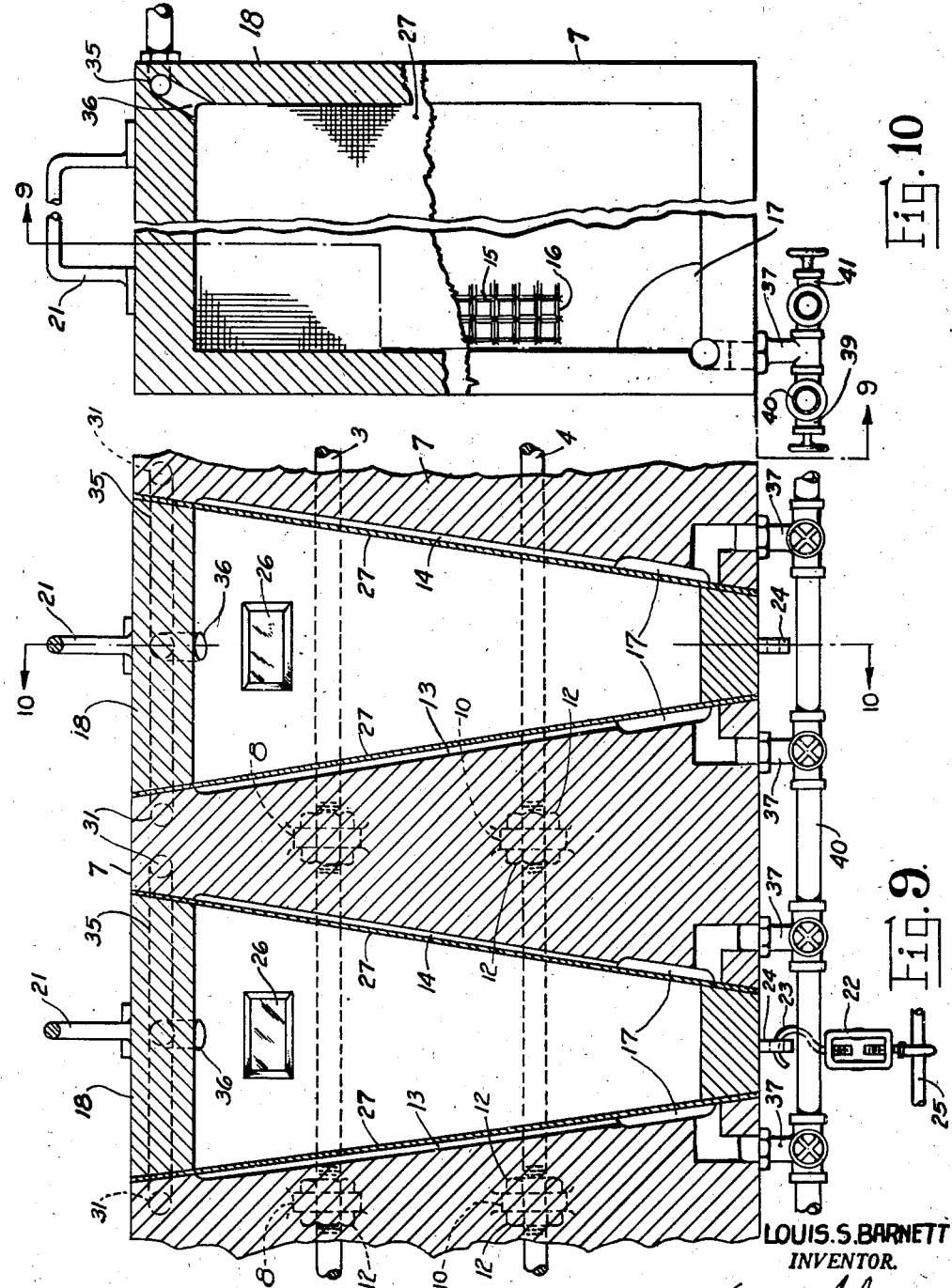
LOUIS S. BARNETT
INVENTOR.
BY *Harry B. Cook*
ATTORNEY Patented Apr. 1, 1947

2,418,153

UNITED STATES PATENT OFFICE 2,418,153

FILTER PRESS

Louis S. Barnett, Newark, N. J.

Application March 4, 1944, Serial No. 525,010

6 Claims. (Cl. 210—62)

This invention relates to a filter construction for filtering slurry.

It is the principal object of my invention to provide a construction in which the filters which collect the undesirable material from the slurry may be quickly and easily removed for cleaning or repair purposes without disassembling the entire structure.

Another object of my invention is to provide a ready means for washing the filter cake and for cleaning those parts of the structure which are normally held in fixed position in the framework of the structure.

Other objects will be discerned by one familiar with this type of apparatus on a reading of the specification taken in connection with the annexed drawings wherein:

Figure 1 is a side elevation, shown somewhat schematically, of the assembled structure.

Figure 2 is a bottom plan view of Figure 1 with certain parts removed, such as the framework, drip pan, etc.

Figure 3 is an end view of one of the fixed units.

Figure 4 is a view looking in the direction of line 4—4 of Figure 3.

Figure 5 is a view of Figure 3 looking from right to left.

Figure 6 is an end view of one of the removable units.

Figure 7 is a view of Figure 6 looking from right to left.

Figure 8 is an exploded perspective view of one end of the structure.

Figure 9 is a view approximately on the line 9—9 of Figure 10.

Figure 10 is a view on the line 10—10 of Figure 9, with the filter broken away to show the adjacent surface of the fixed member with which it is associated.

In the various views, wherein like numbers refer to corresponding parts, 1 and 2 are end frame members to which are fastened threaded support rods 3 and 4 on opposite ends of the filter units. The rods 3 and 4 carry, in fixed position, a plurality of units, the end units being numbered 5 and 6, while the intermediate fixed units are collectively numbered 7. The ends of all of these units are supplied with mounting clips 8, each having a recess 9 to receive the support rods 3. Similar clips 10, having orifices 11 therein, receive the support rods 4. Nuts 12, carried on the rods 3 and 4, are used to clamp the clips 8 and 10 securely to the rods.

The fixed units 7 have the greater portion of their opposite sides 13 and 14 formed as by means of vertical grooves 15 and horizontal grooves 16 to carry down to the bottom portion thereof the liquid passing through filtering material to which reference will be later made. Preferably, the lower adjacent corners have spaces or recesses 17 to receive the liquid coming from the grooves 15 and 16. The passage of the material to be filtered through the structure will be later referred to.

Spaced between the units 7, are units 18 which are hollow, with openings in their opposite sides 19 and 20. The tops of the units are provided with handles 21 for removing the units from their operative position as indicated in Figure 1. It will be noted that the fixed units 7 and the removable units 18 are each formed like the frustum of a pyramid and are located in reverse position in the assembled relation shown in Figure 1; that is to say, the frustum of the unit 7 is at the top, while the frustum of the unit 18 is at the bottom of the structure. More specifically, the units 7 and 18 are wedge-shaped and the inclined sides of each unit 7 are in opposed relation to the inclined sides of the next adjacent units 18, the narrower ends of the units 18 and 7 being located, respectively, at the bottom and the top of the structure.

The units 18 are held in firm relationship with the units 7 by means of turnbuckles 22, the hook portions 23 of which engage eye members 24 fastened to the bottom of the units 18. The lower part of each turnbuckle 22 engages a frame member 25 which may be in the shape of a stiff rod. The units 18 may also be provided on opposite ends with sight members 26 which may be of glass of suitable strength so that an attendant may observe the passage of the slurry through the removable units 18.

Positioned between the removable units 18 and the fixed units 7, are filter members 27 made of any suitable material. It will be noted that the unit 18 has, on its opposite sides around the opening, sufficient surface 28 to constitute a seat for the peripheral edge of the filtering member 27. Likewise, the peripheral surface 29 of the unit 7 forms a cooperative seat similar to 28.

Coming now to the operation of the filter structure, it will be noted that the slurry or material to be filtered is passed by the pump S through the pipe 30 and is preferably fed to passageways 31 in the fixed units 7 by valves 32 and 33. Each of the filtering members 27 has an opening 34 therein which, when the parts are assembled, is in alignment with its co-operative passageway 31 in the unit 7, whereby the slurry is fed to an orifice 35 in the removable units 18, and from this passageway 35 through an opening 36 into the hollow portion of the unit, from which space it passes through the filtering members 27 onto the grooved surfaces of the adjacent fixed units.

By means of these grooves, the liquid is passed to the spaces 17 at the bottom portion of the fixed units 7, and these spaces are connected by pipes 37 to fittings 38, and by way of the valves 39 to the outlet pipe 40, it being understood that the valves 41, which are connected to the fittings 38, are at this particular time closed.

When it is desired to wash the filter cake from the grooves 15 and 16 in the fixed units 7, the valves 39 are all closed and the valves 41 connecting the pipes 37 to the wash water discharge pipe 50 are all open, together with the valves 42 which control the flow of the wash water from the pipe 44 that is connected to the wash water pump W into the top of the fixed units 7 which preferably have recesses or spaces 43 to receive the wash water coming from the feed pipe 44 by way of the valve 42 into these spaces by means of the passageways 45. From the spaces 43, the wash water is forced through the grooves 15 and 16 and finally into the recesses 17 and out through the pipe 37 into the water-discharge pipe 50.

It is to be understood that when the filtering members 27 become fouled up so that the washing just described will not clean the filtering members, then the turnbuckles 22 are loosened and the units 18 are removed, together with the filtering members 27, and cleaned. It may be remarked that in the assembly of the structure, the peripheral edges of the filtering members 27 may be treated with a sealing compound such as usually used on gaskets to provide sealed joints around the cooperating edges 28 and 29 of the units 18 and 7.

The complete structure as shown in Figure 1 is provided with a drip pan 46 and a discharge valve 47 to take away any drip collected by the pan 46 during the operation of the structure or during the washing process.

From what has been said, it will be seen that I have provided a filter structure in which the alternate filter units may be quickly and easily removed for cleaning and repair purposes, and because these units are removable, any further cleaning may be performed on the grooved surfaces of the units 7 if necessary. Moreover, the units 7 and the frames 18 can be removed for repair of the press, and additional plates or frames can be inserted, all without stopping the filtering operation, it being possible to cut off the liquid flow from any plate or frame by closing of the proper valves. Consequently, continuous operation of the press is possible and less plates and frames are necessary for a given output of filtrate per unit of time.

Also, it will be understood that if desired, certain of the plates may be constructed without wash-water inlets and may be arranged in any preferred relation to the other plates.

What I claim is:

1. A filter press including a framework, a plurality of wedge-shaped fixed and removable units arranged in alternate relationship on said framework with the narrow ends of the fixed units and the removable units facing upwardly and downwardly respectively, each of the removable units having a frame construction with two opposite sides open and means for feeding liquid to be filtered into the interior of said removable unit, filtering elements covering the two open sides of each removable unit, means fixedly mounting said fixed units on said framework, releasable means for directly engaging and pressing each removable unit against the fixed units at opposite sides of said removable unit with said filtering members tightly clamped between said units and for releasing said removable units for removal from the filter press without disturbing the fixed units, the fixed units having their opposite sides formed to receive the liquid from the removable units through said filtering members, and means for taking away the filtered liquid from said fixed units.

2. A filter structure including a series of units arranged in tandem, the end units and every alternate one being held in a fixed position while the intervening units are removably positioned between the fixed units, all units having tapered sides presented each to the other, those of the removable units tapering inwardly and downwardly, while the sides of the fixed units taper in reverse direction, filtering members located between said units, with means for drawing the removable units downwardly to press the units one against the other with said filtering members between them said means also serving to release the removable units which are provided with means for withdrawing them from assembled position after being released, the removable units having formations to receive slurry and to pass it to said filtering members, slurry conveyors associated with the filter structure, the fixed units having fittings connected to said slurry conveyors and passages leading from the fittings to passages in the removable units for allowing the slurry to move into the receiving formations therein, the fixed units having recesses at their lower portions and having grooved faces next to the filtering members and leading to said recesses to carry the filtered liquid to said recesses, and fittings attached to said lower portion for passing the liquid to a conveyor.

3. A filter press including a framework, a plurality of units arranged in tandem, means fixedly mounting the end units and alternate units on said framework while the other units are removably positioned between the fixed units, the removable units having two opposite sides converging downwardly while two opposite sides of the fixed units converge upwardly, each removable unit having an opening therein extending through said two converging sides, filtering members disposed across the ends of said opening of each removable unit, means for drawing said removable units downwardly to clamp said filtering members between said sides of each removable unit and the adjacent fixed units, said fixed units having liquid-receiving surfaces overlaid by said filtering members and formed to receive liquid from said removable units through said filtering elements and to conduct such liquid to the bottoms of said fixed units, and said fixed units having outlet passages for such liquid, and means for introducing liquid to be filtered into said openings in said removable units.

4. The filter press as defined in claim 3 wherein said means for introducing liquid to be filtered into said openings in said removable units includes a hole extending through each of the inclined sides of each removable unit beyond the ends of said opening in said removable unit and communicating with said opening intermediate said ends thereof, a passageway in each fixed unit registering with one of said holes in the removable units when all of said fixed and removable units are in assembled relation, and a common feed pipe connected to all of said passageways.

5. The filter press as defined in claim 3 wherein each fixed unit has inlets and means for connecting them to a source of wash water for directing washwater over said liquid-receiving surfaces and through said filtering members and with the addition of a common outlet pipe for filtered liquid having a branch for each of said outlet passages of said fixed units, a common discharge pipe for wash water having a branch for each of said outlet passages, and valves for selectively causing communication between said outlet passages and said common outlet pipe for filtered liquid or said common discharge pipe for wash water.

6. The filter press as defined in claim 1 wherein each removable unit has a window positioned to permit observation of the space within said removable unit.

LOUIS S. BARNETT.

REFERENCES CITED

The following references are of record in the file of this patent:

UNITED STATES PATENTS

| Number | Name | Date |
| --- | --- | --- |
| 862,286 | Scoenfeld | Aug. 6, 1907 |
| 209,874 | Enzinger | Nov. 12, 1878 |
| 393,633 | Enzinger | Nov. 27, 1888 |
| 2,293,120 | De Lisle | Aug. 18, 1942 |

FOREIGN PATENTS

| Number | Country | Date |
| --- | --- | --- |
| 629,402 | French | July 5, 1927 |
| 422,861 | French | Jan. 31, 1911 |
| 489,860 | British | Aug. 4, 1938 |
| 512,972 | British | Sept. 29, 1939 |